Nov. 8, 1927. 1,648,201
J. SIDNEY
SHOCK ABSORBER
Filed June 12, 1926
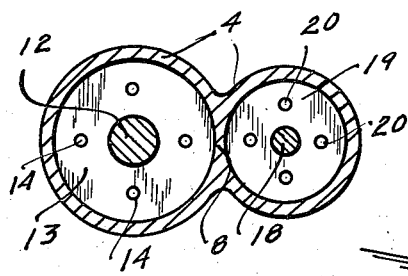
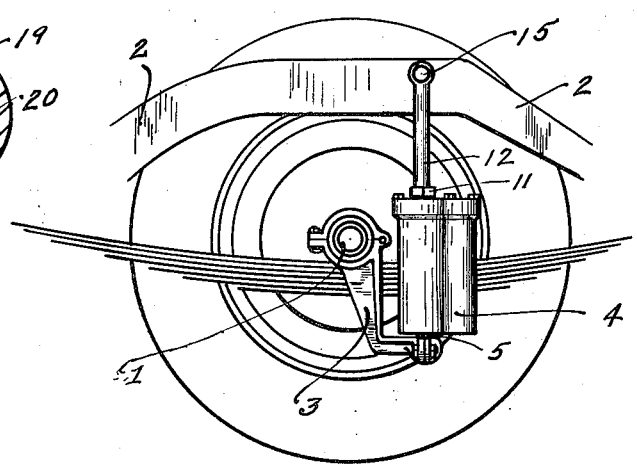
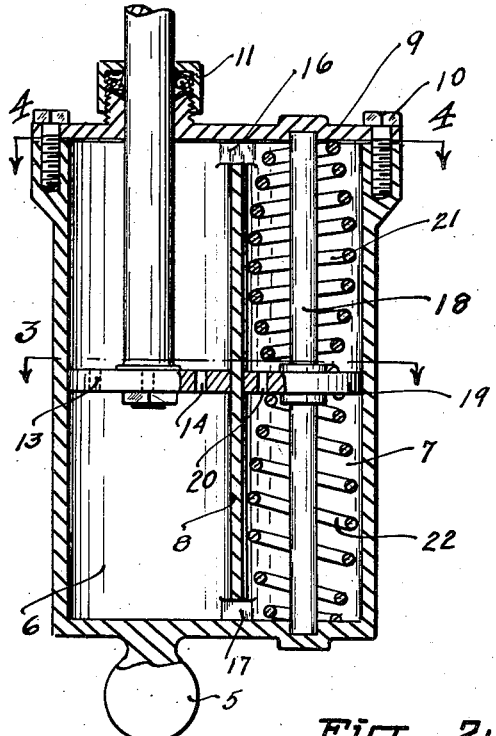
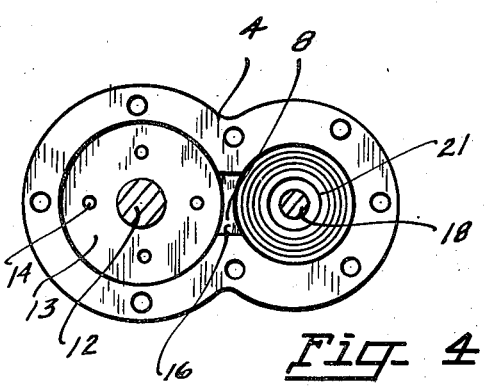
Inventor
John Sidney
Attorney Patented Nov. 8, 1927.

1,648,201

UNITED STATES PATENT OFFICE.

JOHN SIDNEY, OF PORTLAND, OREGON.

SHOCK ABSORBER.

Application filed June 12, 1926. Serial No. 115,625.

The object of my invention consists in means for preventing the rebound from shock imparted to the body of a motor vehicle.

Further objects of my invention consist in means preventing all of the shock imparted to the wheels of motor vehicles being imparted to the body of the vehicle.

Still further objects of my invention consist in a stabilizer means adapted to maintain an equilibrium in the device which is at all times under equalized compression.

The device consists in a frame having two cylinders disposed within the frame and having a piston disposed within one of the cylinders and a piston rod secured to the piston and suitable means provided for attaching the piston rod to the body or frame of the car. Escapement ports are disposed through the piston. A wall diaphragm is disposed between the cylinders having ports disposed therethrough and an oscillating piston is disposed within the secondary cylinder said oscillating piston being in slidable relation with a central rod and a compression spring being disposed at either side of the oscillating piston in equilibrium. Ports are disposed through the oscillating piston. The cylinders are filled with any suitable liquid medium, as castor oil. A bracket support is secured to the axle of the motor vehicle and a ball and socket connection connects the bracket and the cylinder frame With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:—

Fig. 1 is a fragmentary side elevation of a motor vehicle, illustrating one of my new and improved devices in place and position upon the same.

Fig. 2 is a vertical section view through the cylinders of the device, illustrated detached from the bracket support.

Fig. 3 is a sectional view, taken on line 3—3 of Fig. 2, looking in the direction indicated.

Fig. 4 is a cross section view, taken on line 4—4 of Fig. 2, looking in the direction indicated.

Like reference characters refer to like parts throughout the several views.

1 is the axle of the motor vehicle and 2 is the frame of the same. A bracket 3, is secured to the axle of the motor vehicle and 4 is the main frame of the device, terminating in a ball 5, on its lower end, which is adapted to rest in and be supported by the bracket 3, by a suitable bearing of this type. The main frame 4 has a primary cylinder 6 disposed therein and a secondary cylinder 7. A diaphragm 8 separates the two cylinders. A cylinder head 9 is secured to the top of the main frame 4 and is maintained in position through suitable fastening means, as bolts 10. A gland nut 11 is disposed about piston rod 12 to prevent the leakage of the operating medium, as oil, from the cylinder. A piston 13 is disposed in the primary cylinder and piston rod 12 is attached thereto. The piston 13, has ports 14 disposed therethrough to permit the passage of the operating medium therethrough. Piston rod 12 has suitable means disposed at its upper end for attachment to the frame 2 of the motor vehicle, as by a pin or bolt 15. Disposed across the diaphragm 8, at either end, are passageways 16 and 17 to permit of the passage of the operating medium freely from one cylinder to the other. A stationary rod 18, is disposed within the secondary cylinder, the same being seated within the main casting frame 4, and the cylinder head 9, and the same is centrally disposed within the secondary cylinder. A piston 19, is in slidable relationship with the rod 18 and within the cylinder walls. Ports 20 are disposed through the piston 19. Compressing springs 21 and 22 are disposed at either side of the piston 19, the purpose of which is to maintain the piston in equilibrium and maintain a balance, the opposite ends of the springs resting upon the cylinder heads.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:—

1. A shock absorber comprising a bracket, a main frame disposed upon the foot of the bracket, primary and secondary cylinders disposed within the main frame, a piston reciprocably disposed within the primary cylinder and secured to the lower end of a piston rod, a piston rod, the upper end of the piston rod passing through the cylinder head and secured to the frame of the motor vehicle, a stationary rod centrally disposed within the secondary cylinder, a piston reciprocably disposed within the secondary cylinder and compression springs adapted to normally maintain the piston in equilibrium.

2. The combination in a shock absorber of a pair of integral cylinders; including intercommunicating passageways formed through each end of their integral wall; a piston and a piston rod reciprocally disposed within one of said cylinders; there being passageways formed through said piston communicating with the cylinder compartment at each side of said cylinder; a vertical rod mounted in the other of said cylinders; a piston slidably mounted on said rod; said last mentioned piston being provided with passageways communicating with the chambers at each side thereof; and compression springs disposed upon said rod to engage said last mentioned piston and limiting the movement thereof on said rod.

3. In combination in a shock absorber of a bracket and a main frame secured together in a working relationship through the medium of a ball and socket bearing, primary and secondary cylinders in parallel alignment disposed within the main frame, a piston and piston rod reciprocable within the primary cylinder, ports disposed through the piston in the primary cylinder, a ported diaphragm disposed between the primary and secondary cylinders, a stationary rod disposed centrally of the secondary cylinder and in fixed position, a reciprocable ported piston disposed within the secondary cylinder and in slidable relationship with the fixed rod disposed therein, and compression spiral springs disposed about the fixed rod and engaging on their one end with the cylinder heads and on the other with the piston, said cylinders being adapted to maintain an operating medium therein and an operating medium consisting of an oil the viscosity of which is equal to castor oil.

JOHN SIDNEY.